(12) United States Patent
Maltby et al.

(10) Patent No.: US 9,049,111 B2
(45) Date of Patent: Jun. 2, 2015

(54) PROGRESSIVE CHARTING OF NETWORK TRAFFIC FLOW DATA

(75) Inventors: David Raymond Maltby, New Braunfels, TX (US); Joel Dolisy, Austin, TX (US)

(73) Assignee: SOLARWINDS WORLDWIDE, LLC, Austin, TX (US)

( * ) Notice: Subject to any disclaimer, the term of this patent is extended or adjusted under 35 U.S.C. 154(b) by 315 days.

(21) Appl. No.: 12/781,432

(22) Filed: May 17, 2010

(65) Prior Publication Data

US 2011/0280139 A1 Nov. 17, 2011

(51) Int. Cl.
*H04L 12/26* (2006.01)
*H04L 12/24* (2006.01)

(52) U.S. Cl.
CPC ............ *H04L 43/067* (2013.01); *H04L 43/062* (2013.01); *H04L 43/045* (2013.01); *H04L 41/22* (2013.01); *H04L 43/026* (2013.01)

(58) Field of Classification Search
USPC .................................................. 370/252, 253
See application file for complete search history.

(56) References Cited

U.S. PATENT DOCUMENTS

| | | | |
|---|---|---|---|
| 6,965,574 B1 | 11/2005 | Cook et al. | |
| 7,039,015 B1 * | 5/2006 | Vallone et al. | 370/252 |
| 7,075,536 B1 | 7/2006 | Goldschmidt | |
| 7,292,246 B2 * | 11/2007 | Goldschmidt | 345/440 |
| 2006/0007858 A1 | 1/2006 | Fingerhut et al. | |
| 2007/0203816 A1 * | 8/2007 | Costache et al. | 705/35 |
| 2008/0133542 A1 | 6/2008 | Lerro et al. | |
| 2008/0151771 A1 * | 6/2008 | Dowse | 370/252 |
| 2009/0019147 A1 * | 1/2009 | Ahlers et al. | 709/224 |
| 2009/0193436 A1 * | 7/2009 | Du et al. | 719/318 |
| 2010/0027426 A1 * | 2/2010 | Nair et al. | 370/238 |

FOREIGN PATENT DOCUMENTS

| | | |
|---|---|---|
| CN | 1617512 A | 5/2005 |
| JP | 2005-190107 A | 7/2005 |
| WO | 2008/064934 A1 | 6/2008 |
| WO | 2009/153687 A1 | 12/2009 |

OTHER PUBLICATIONS

K.S. Lim et al., "Real-Time Views of Network Traffic Using Decentralized Management", IEEE Interview Symposium on Integrated Network Management, Jun. 13, 2005, pp. 119-132.
International Search Report application No. PCT/US2011/031937 dated Apr. 11, 2011.
Extended European Search Report dated Jul. 9, 2014, issued in corresponding EP Patent Application No. 11783903.5.
Office Action dated Nov. 4, 2014, issued in corresponding JP Patent Application No. 2013-511160 (with English translation).
Office Action dated Jan. 14, 2015, issued in corresponding CN Patent Application No. 201180024678.8 (English translation only).

* cited by examiner

*Primary Examiner* — Yemane Mesfin
*Assistant Examiner* — Peter Chen
(74) *Attorney, Agent, or Firm* — Squire Patton Boggs (US) LLP

(57) ABSTRACT

Embodiments of the invention include an apparatus, method, and computer program for progressive charting of network traffic flow data. The method includes, in one example, receiving, at a network traffic analyzer, a query of network traffic flow data over a certain time period. The method further includes modifying the query to produce sub-queries each based on different segments of time within the certain time period, executing at least one of the sub-queries, and incrementally outputting results of each of said executed sub-queries as each of the sub-queries are completed.

4 Claims, 7 Drawing Sheets

PROGRESSIVE CHARTING OF NETWORK TRAFFIC FLOW DATA

BACKGROUND

1. Field

Embodiments of the invention generally relate to network traffic analysis and reporting. More particularly, examples of the invention are directed to methods, systems, and computer programs for reporting on network traffic flow data.

2. Description of the Related Art

Network traffic flow data is of interest to network administrators for a number of reasons, including analyzing the impact of a new application on the network, troubleshooting network pain points, detecting heavy users of bandwidth, and securing networks. The primary protocol associated with traffic flow data is NetFlow which was developed by Cisco Systems®. There are also several other varieties of flow protocols, such as sFlow, IPFIX, Jflow, NetStream, and Cflowd. All of these protocols support flows that are similar to NetFlow and contain similar types of information, such as source internet protocol (IP) address, destination IP address, source port, destination port, IP protocol, ingress interface, IP Type of Service, start and finish times, number of bytes, and next hop.

As networks become larger and more complex, systems that analyze and report on traffic flow data must become more efficient at handling the increasing amount of information generated about network traffic. Aggregating data from many network devices can result in datasets that contain billions of entries or flows. Additionally, running reporting queries on a dataset of large size can be taxing on the storage system or database. Traditional methods for solving this data overflow problem have been to improve the quantity or quality of the hardware that hosts the storage system.

SUMMARY

One embodiment of the invention is directed to a method. The method includes receiving, at a network traffic analyzer, a query of network traffic flow data over a certain time period, and modifying the query to produce sub-queries each based on different segments of time within the certain time period. The method further includes executing at least one of the sub-queries, and incrementally outputting results of each of said executed sub-queries as each of the sub-queries are completed.

Another embodiment is directed to an apparatus. The apparatus includes a receiver configured to receive a query of network traffic flow data over a certain time period, and a processor. The processor is configured to control the apparatus to modify the query to produce sub-queries each based on different segments of time within the certain time period, to execute at least one of the sub-queries, and to incrementally output results of said sub-queries as the sub-queries are completed.

Another embodiment is directed to a computer program embodied on a computer readable medium. The computer program is configured to control a processor to perform operations including receiving, at a network traffic analyzer, a query of network traffic flow data over a certain time period, and modifying the query to produce sub-queries each based on different segments of time within the certain time period. The operations may further include executing at least one of the sub-queries, and incrementally outputting results of each of said executed sub-queries as each of the sub-queries are completed.

Another embodiment is directed to an apparatus. The apparatus includes receiving means for receiving, at a network traffic analyzer, a query of network traffic flow data over a certain time period, and modifying means for modifying the query to produce sub-queries each based on different segments of time within the certain time period. The apparatus further includes executing means for executing at least one of the sub-queries, and outputting means for incrementally outputting results of each of said executed sub-queries as each of the sub-queries are completed.

BRIEF DESCRIPTION OF THE DRAWINGS

For proper understanding of the invention, reference should be made to the accompanying drawings, wherein.

DETAILED DESCRIPTION

Embodiments of the present invention include a method, apparatus, system, and/or computer program for reporting on network traffic flow data. Responsiveness is an important aspect of reporting network traffic. A user that requires reports generally has a pressing goal when requesting those reports. This is especially true in the network administration space. Network administrators need to quickly assess the state of the network to troubleshoot any issues that may exist. One important area that network administrators monitor is their network traffic. Network traffic data is often encapsulated in flows. A complex network generates a high number of flows. It can be difficult to produce reports on network traffic when there are an overwhelming number of flows. A single query can take minutes or even hours to complete. This loss of time can be costly to an organization if a business critical service is not performing properly. Embodiments of the present invention solve these problems by returning the most important data to the network administrator (user) quickly. According to one example, the most important data is understood to be the service, protocol, or entity that is consuming the greatest number of resources.

Thus, embodiments of the invention include a system that improves responsiveness of network traffic flow reporting by sending charts incrementally as segmented queries are executed and results are returned. In one example, a network traffic analyzer scans for proper entities to report on. In some embodiments, the network traffic analyzer will select the network entities consuming the highest amount of network bandwidth for reporting. The network traffic analyzer can then select data from each entity for the most recent period of time. The network traffic analyzer may generate and send a chart representing the first period of time. The network traffic analyzer then repeats this process for each next most recent period of time. As a result, the initial response time of network traffic flow reporting is significantly improved.

Figure 1:
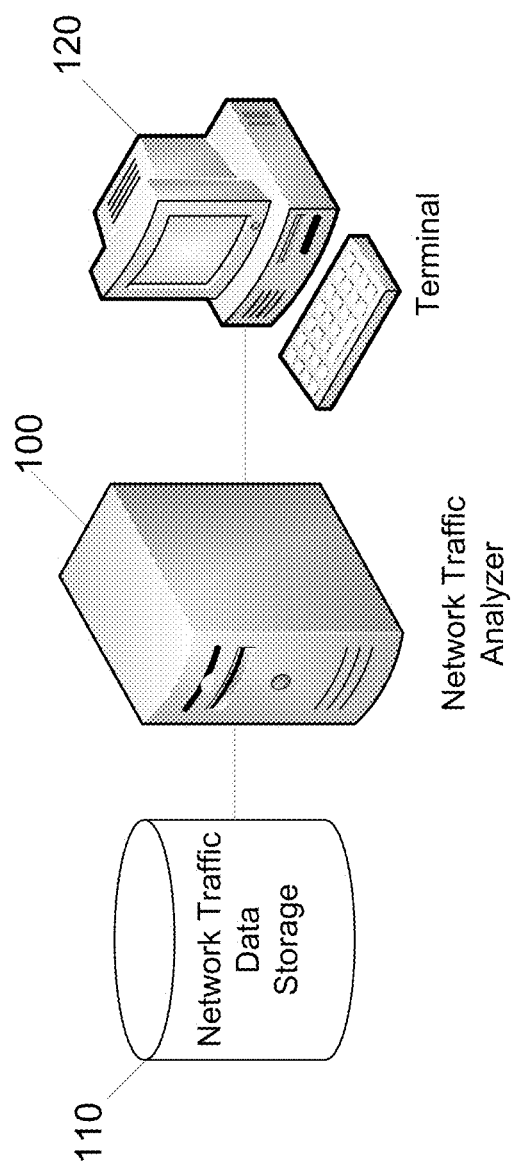
FIG. 1 illustrates a system according to one embodiment.

FIG. 1 illustrates an exemplary system according to one embodiment. The system includes network traffic analyzer 100, network traffic data storage 110, and a terminal 120. Network traffic data storage 110 stores network traffic flow data. Network traffic data storage 110 can be a database or any other appropriate storage device. A user, such as a network administrator, may utilize terminal 120 to send a request or query to the network traffic analyzer 100. The request may be, for example, a request for a report on network traffic flow data related to one or more network entities in the network. In some embodiments, the request may indicate a certain number of network entities and a certain time period in which the network administrator is interested.

The network traffic analyzer 100 receives the request from the terminal 120 and scans for the proper entities to report on. For instance, if the user requested a report on the entities that are the top five traffic producers on the network over the last day, the network traffic analyzer 100 will create a query to retrieve the first five results, ordered by the sum of the data transferred. The network traffic analyzer 100 then sends an initial response to the terminal 120 that indicates which entity is producing the most traffic on the network. This is the quickest way to deliver immediate feedback to the user who is interested in finding a problem on the network.

Next, the network traffic analyzer 100 incrementally generates a chart to represent the requested time period. For instance, continuing with the example above, the network traffic analyzer 100 would start by creating a query, which is sent to the network traffic data storage 110, to retrieve the total amount of data transferred by the previously identified top five traffic producers over the most recent segment of time. This segment of time could be an hour, two hours, or any other useful segment of time. In one example, the segment of time is some portion of the time period included in the request by the user. Therefore, in some embodiments, the network traffic analyzer 100 can modify the request to produce a partial request or sub-query that covers a time segment within the requested time period. In this manner, the network traffic analyzer 100 can produce incremental results for the request in a faster and more efficient manner, as will be discussed in further detail below.

Figure 2:
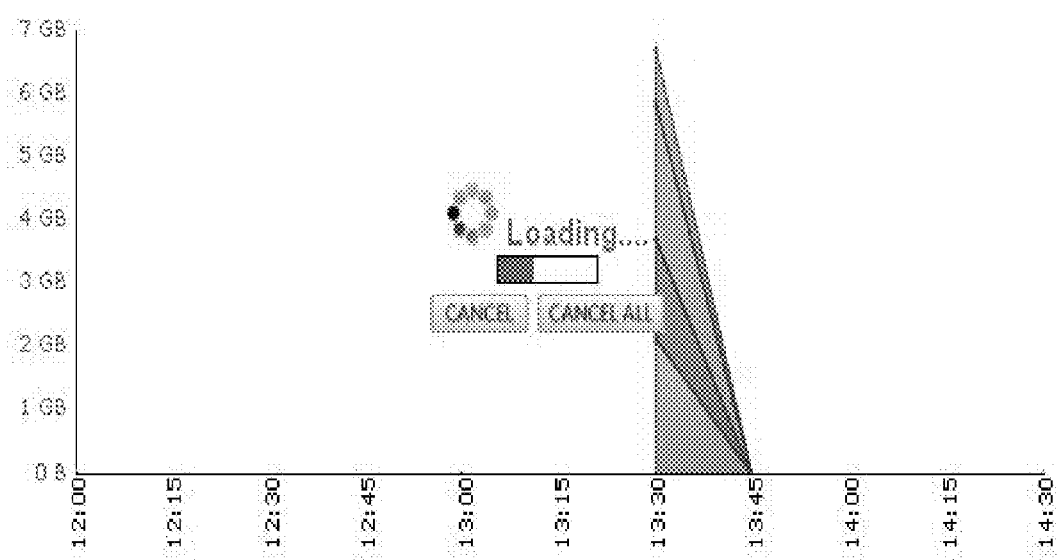
FIG. 2 illustrates an initial chart produced by an exemplary embodiment of the invention.

In response to the query received from the network traffic analyzer 100, the network traffic data storage 110 retrieves the total amount of data in accordance with the parameters provided by the query, and returns the retrieved information to the network traffic analyzer 100. When the network traffic data storage 110 returns the results of the query, the network traffic analyzer 100 generates an image or data representation of a chart that illustrates the results of the query and sends the initial results to the user. FIG. 2 illustrates an example incremental chart for the initial incremental segment of time. The chart updates may be drawn or produced either at the terminal 120 (client side) or at the network traffic analyzer 100 (server side). In one embodiment, the initial incremental chart or result can be delivered twice as fast or faster than a complete chart.

Figure 3:
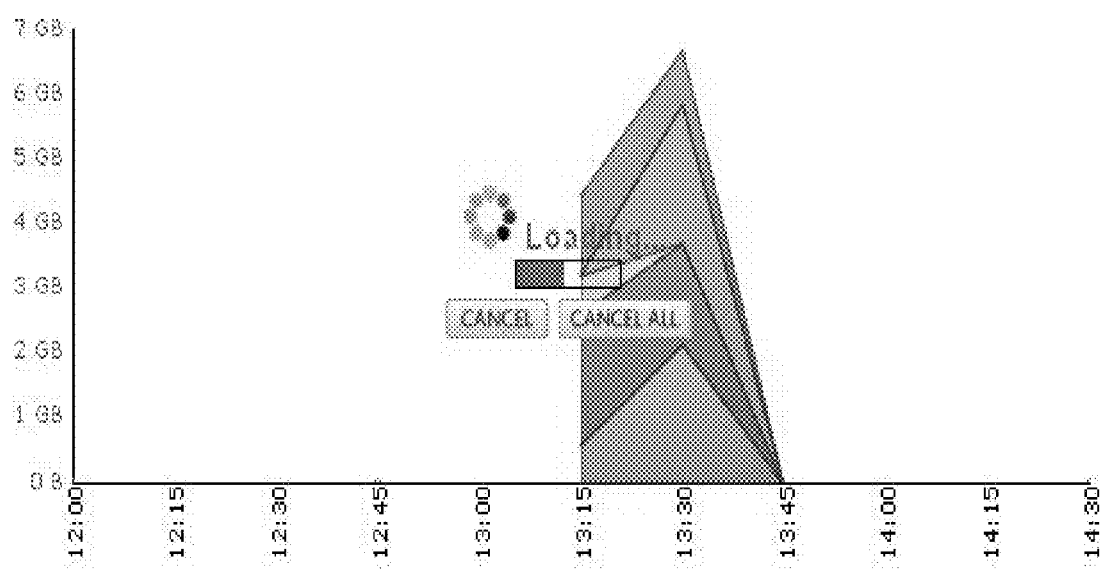
FIG. 3 illustrates another chart according to an embodiment of the invention.
Figure 4:
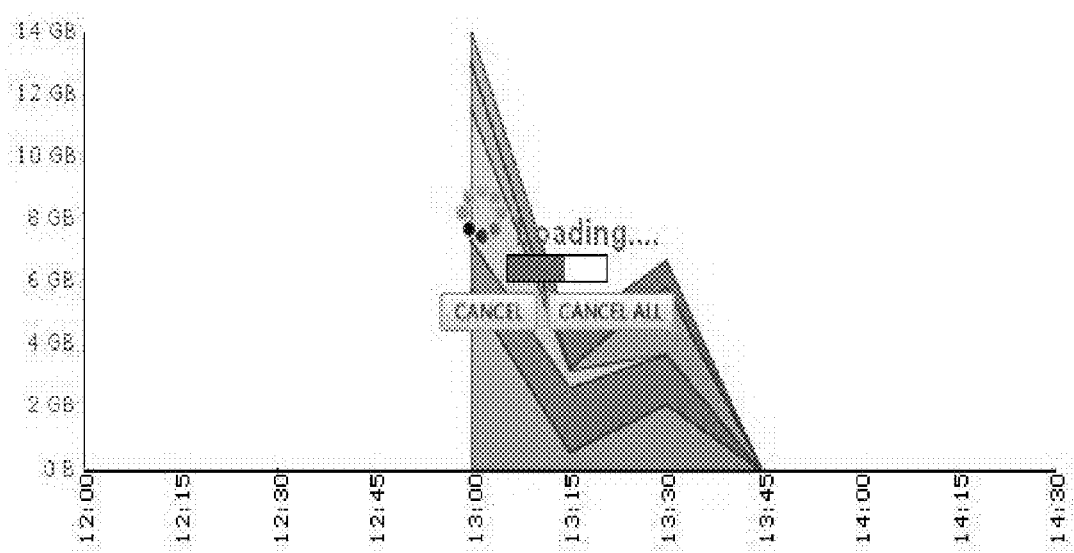
FIG. 4 illustrates yet another chart according to one embodiment.
Figure 5:
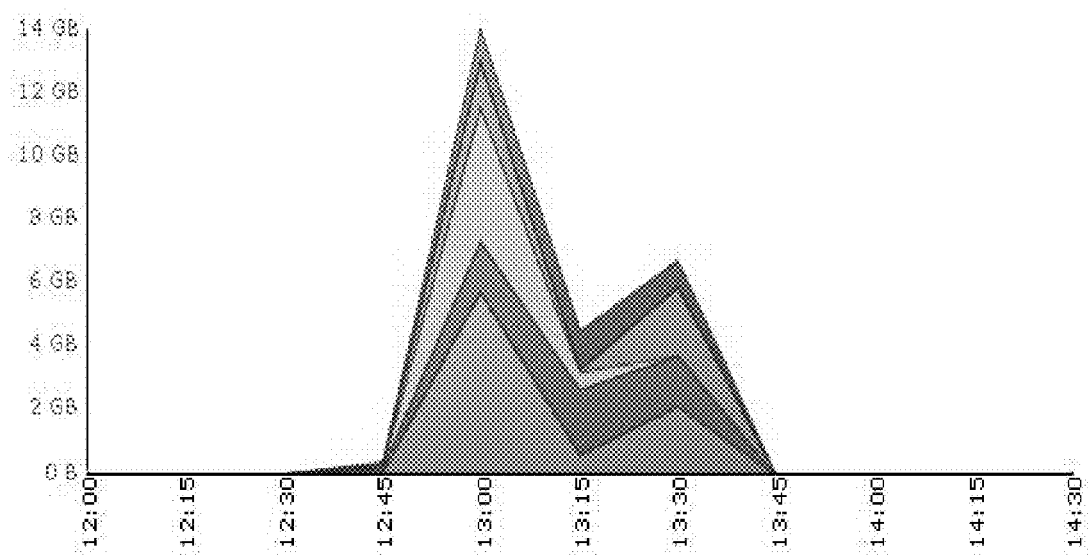
FIG. 5 illustrates a complete chart in accordance with an embodiment.

The network traffic analyzer will continue to query the network traffic data storage 110 and produce additional incremental results that are incorporated into the chart as shown in FIGS. 3 and 4. In particular, according to one embodiment, the process is repeated for each subsequent segment of time, iteratively returning a more complete chart to the user until the chart is completed as shown in FIG. 5.

Figure 6:
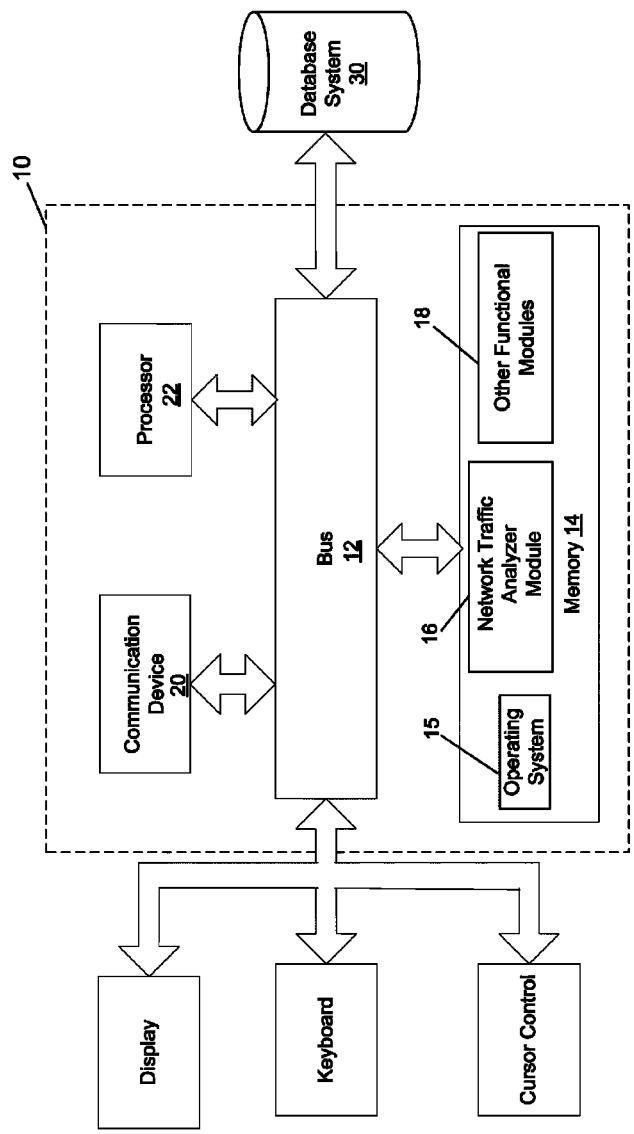
FIG. 6 illustrates a system according to one embodiment.

FIG. 6 illustrates a block diagram of a system 10 that may implement one embodiment of the invention. System 10 includes a bus 12 or other communications mechanism for communicating information between components of system 10. System 10 also includes a processor 22, coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer readable media. System 10 further includes a communication device 20, such as a network interface card or other communications interface, to provide access to a network. As a result, a user may interface with system 10 directly or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD") of terminal 120, for displaying information to a user, such as network traffic information. A keyboard 26 and a cursor control device 28, such as a computer mouse, are further coupled to bus 12 to enable a user to interface with system 10. Processor 22 and memory 14 may also be coupled via bus 12 to a database system 30 and, thus, may be able to access and retrieve information stored in database system 30. In one embodiment, database system 30 is the network traffic data storage 110 illustrated in FIG. 1. Although only a single database is illustrated in FIG. 6, any number of databases may be used in accordance with certain embodiments.

In one embodiment, memory 14 stores software modules that provide functionality when executed by processor 22. The modules may include an operating system 15 that provides operating system functionality for system 10. The memory may also store a network traffic analyzer module 16, which provides an enhanced network traffic analysis solution through improved responsiveness of network traffic flow reporting. System 10 may also include one or more other functional modules 18 to provide additional functionality.

Database system 30 may include a database server and any type of database, such as a relational or flat file database. Database system 30 may store data related to network traffic flow of each of the entities in the network, and/or any data associated with system 10 or its associated modules and components.

In certain embodiments, processor 22, network traffic analyzer module 16, and other functional modules 18 may be implemented as separate physical and logical units or may be implemented in a single physical and logical unit. Furthermore, in some embodiments, processor 22, network traffic analyzer module 16, and other functional modules 18 may be implemented in hardware, or as any suitable combination of hardware and software.

Additionally, in some embodiments, system 10 may include a receiver configured to receive a query of network traffic flow data over a certain time period. Once such a query is received, processor 22 is configured to control system 10 to segment the query into sub-queries each based on different segments of time within the certain time period, and to execute at least one of the sub-queries. Once a sub-query is executed and its result returned, processor 22 can control system 10 to incrementally output the results of that sub-query immediately as it is completed. According to one embodiment, processor 22 is further configured to control system 10 to generate a graphical chart which illustrates the incremental results of the sub-query. System 10 is configured to iteratively execute sub-queries and iteratively perform the incremental outputting until all of the sub-queries are completed such that the graphical chart illustrates the complete results of the query.

As mentioned above, according to one example, the query received by system 10 relates to traffic flow data from at least one network entity. In some embodiments, processor 22 may be further configured to control system 10 to scan a plurality of network entities to report on, and to select for reporting at least one network entity that transfers a largest amount of data among the plurality of network entities. According to certain embodiments, system 10 may select, for example, the five network entities that are transferring the largest amount of data among all of the network entities in the network.

Figure 7:
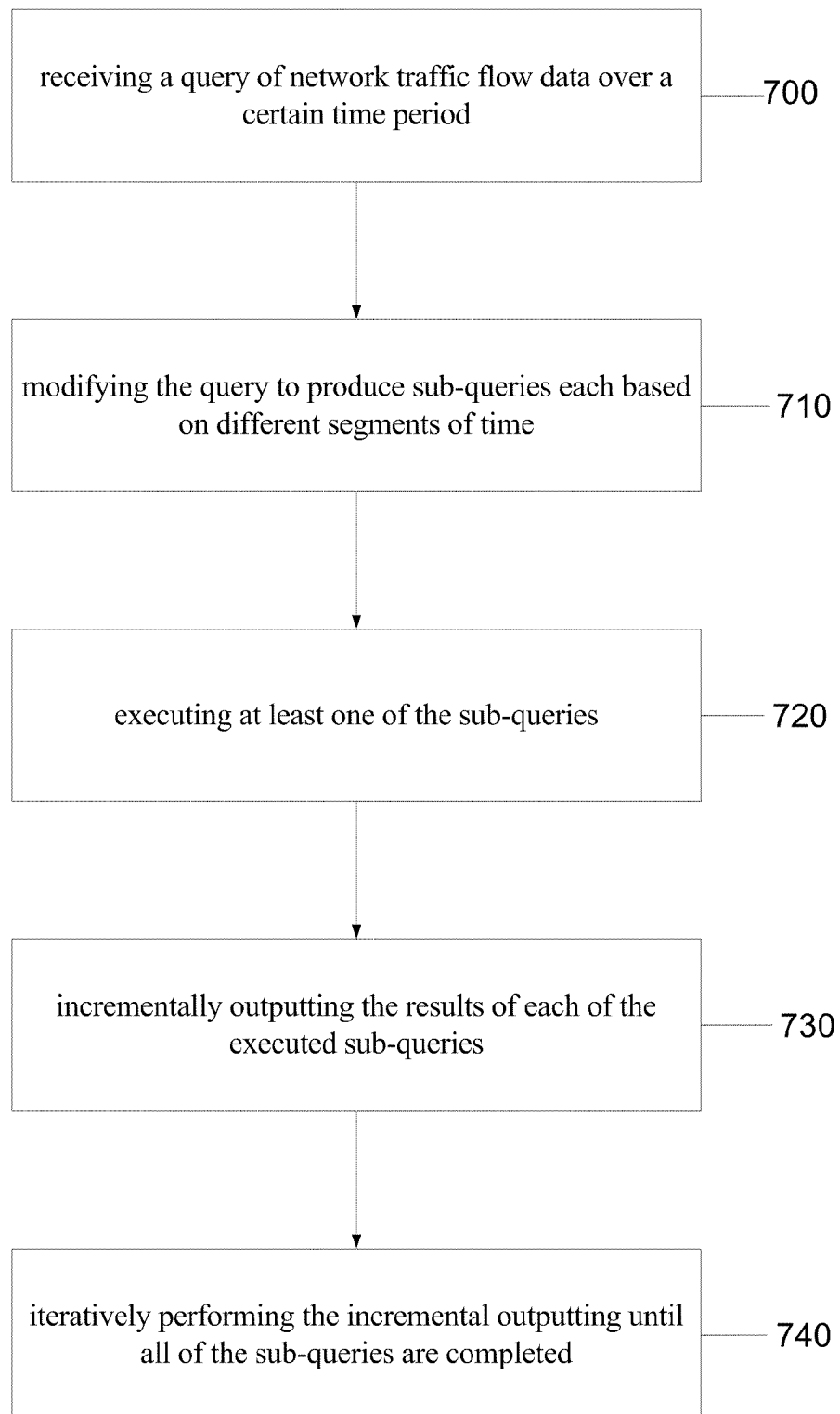
FIG. 7 illustrates an exemplary method according to one embodiment.

Embodiments of the invention also include a method for progressively charting network traffic flow information, as illustrated in FIG. 7. The method includes receiving 700, at a network traffic analyzer, a query of network traffic flow data over a certain time period. At 710, the method includes modifying the query to produce sub-queries each based on different segments of time within the certain time period. At 720, the method includes executing at least one of the sub-queries, and, at 730, incrementally outputting the results of each of the executed sub-queries as each of the sub-queries are completed. At 740, the method includes iteratively performing the incremental outputting until all of the sub-queries are completed.

In one embodiment, incrementally outputting the results includes immediately outputting the results of a sub-query when the sub-query is completed. Additionally, in some embodiments, incrementally outputting the results includes generating a graphical chart illustrating the incremental results of the sub-query. The query received by the network traffic analyzer may relate to traffic flow data from at least one network entity. Also, in one embodiment, the method may further include scanning a plurality of network entities to report on, and selecting for reporting at least one network entity that transfers a largest amount of data among the plurality of network entities. In some embodiments, the network traffic analyzer may select the five network entities that transfer the largest amount of data for reporting.

The computer readable medium mentioned above may be at least partially embodied by a transmission line, a compact disk, digital-video disk, a magnetic tape, a Bernoulli drive, a magnetic disk, holographic disk or tape, flash memory, magnetoresistive memory, integrated circuits, or other digital processing apparatus memory device.

The described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

Therefore, one having ordinary skill in the art will readily understand that the invention as discussed above may be practiced with steps in a different order, may be practiced with hardware elements in configurations which are different than those which are disclosed, and that embodiments may be combined in any appropriate manner. Accordingly, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:
1. A method, comprising:
scanning a plurality of network entities to report traffic flow data that encapsulates network traffic data;
selecting for reporting at least one network entity that transfers a largest amount of data among the plurality of network entities;
receiving, at a NetFlow network traffic analyzer, a query of network traffic flow data over a certain time period for the selected at least one network entity;
modifying the query to produce a plurality of sub-queries, wherein each of the sub-queries are based on different segments of time within the certain time period;
executing at least one of the sub-queries;
incrementally outputting results of each of said executed sub-queries as each of the sub-queries are completed; and
iteratively performing the incremental outputting until all of the sub-queries are completed,
wherein said incrementally outputting the results comprises immediately outputting the results of a sub-query when the sub-query is completed, wherein said immediately outputting the results of the sub-query further comprises generating a graphical chart illustrating the incremental results of the sub-query as the sub-query is completed, and wherein the query relates to traffic flow data from at least one network entity.

2. An apparatus, comprising:
a processor configured to control the apparatus to
scan a plurality of network entities to report traffic flow data that encapsulates network traffic data;
select for reporting at least one network entity that transfers a largest amount of data among the plurality of network entities;
a receiver comprised in a NetFlow network traffic analyzer, the receiver configured to receive a query of network traffic flow data over a certain time period for the selected at least one network entity; and
the processor further configured to control the apparatus to
modify the query to produce sub-queries each based on different segments of time within the certain time period;
execute at least one of the sub-queries; and
incrementally output results of said sub-queries as the sub-queries are completed; and
iteratively perform the incremental outputting until all of the sub-queries are completed,
wherein the processor is further configured to control the apparatus to immediately output the results of a sub-query when the sub-query is completed, and to generate a graphical chart illustrating the incremental results of the sub-query as the sub-query is completed, and
wherein the query relates to traffic flow data from at least one network entity.

3. A computer program, embodied on a non-transitory computer readable medium, the computer program configured to control a processor to perform operations comprising:
scanning a plurality of network entities to report traffic flow data that encapsulates network traffic data;

selecting for reporting at least one network entity that transfers a largest amount of data among the plurality of network entities;
receiving, at a NetFlow network traffic analyzer, a query of network traffic flow data over a certain time period for the selected at least one network entity;
modifying the query to produce sub-queries each based on different segments of time within the certain time period;
executing at least one of the sub-queries; and
incrementally outputting results of each of said executed sub-queries as each of the sub-queries are completed; and
iteratively performing the incremental outputting until all of the sub-queries are completed,
wherein said incrementally outputting the results comprises immediately outputting the results of a sub-query when the sub-query is completed, wherein said immediately outputting the results of the sub-query further comprises generating a graphical chart illustrating the incremental results of the sub-query as the sub-query is completed, and wherein the query relates to traffic flow data from at least one network entity.

4. An apparatus, comprising:
scanning means for scanning a plurality of network entities to report traffic flow data that encapsulates network traffic data;
selecting means for selecting for reporting at least one network entity that transfers a largest amount of data among the plurality of network entities;
receiving means for receiving, at a NetFlow network traffic analyzer, a query of network traffic flow data over a certain time period for the selected at least one network entity;
modifying means for modifying the query to produce sub-queries each based on different segments of time within the certain time period;
executing means for executing at least one of the sub-queries; and
outputting means for incrementally outputting results of each of said executed sub-queries as each of the sub-queries are completed,
wherein the outputting means comprises means for iteratively performing the incremental outputting until all of the sub-queries are completed,
wherein said outputting means comprises means for immediately outputting the results of a sub-query when the sub-query is completed, wherein said means for immediately outputting the results of the sub-query further comprises means for generating a graphical chart illustrating the incremental results of the sub-query as the sub-query is completed, and wherein the query relates to traffic flow data from at least one network entity.

* * * * *